(12) United States Patent
Bae et al.

(10) Patent No.: US 10,749,578 B2
(45) Date of Patent: Aug. 18, 2020

(54) BROADCAST RECEIVING APPARATUS

(71) Applicant: Samsung Electronics Co., Ltd., Suwon-si, Gyeonggi-do (KR)

(72) Inventors: Bum-youl Bae, Hwaseong-si (KR); Dong-Uk Seo, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/828,685

(22) Filed: Dec. 1, 2017

(65) Prior Publication Data
US 2018/0219588 A1  Aug. 2, 2018

(30) Foreign Application Priority Data
Feb. 2, 2017 (KR) .................. 10-2017-0014758

(51) Int. Cl.
| | |
|---|---|
| H04B 7/0413 | (2017.01) |
| H04B 1/04 | (2006.01) |
| H01Q 1/38 | (2006.01) |
| H04L 25/49 | (2006.01) |
| H01Q 9/42 | (2006.01) |
| H04L 27/20 | (2006.01) |
| H01Q 5/371 | (2015.01) |
| H01Q 9/06 | (2006.01) |
| H01Q 1/24 | (2006.01) |
| H01Q 1/40 | (2006.01) |

(52) U.S. Cl.
CPC .............. *H04B 7/0413* (2013.01); *H01Q 1/24* (2013.01); *H01Q 1/38* (2013.01); *H01Q 1/40* (2013.01); *H01Q 5/371* (2015.01); *H01Q 9/065* (2013.01); *H01Q 9/42* (2013.01); *H04B 1/0475* (2013.01); *H04B 1/0483* (2013.01); *H04L 25/4902* (2013.01); *H04L 27/205* (2013.01)

(58) Field of Classification Search
CPC .......... G06F 1/1626; H04B 7/024; H01Q 9/14
USPC ........................................................ 375/238
See application file for complete search history.

(56) References Cited

U.S. PATENT DOCUMENTS

| | | | |
|---|---|---|---|
| 6,351,239 B1 * | 2/2002 | Mizuno ............... | H01P 1/20345 343/700 MS |
| 6,429,828 B1 | 8/2002 | Tinaphong et al. | |
| 2002/0060645 A1 * | 5/2002 | Shinichi ............... | H01Q 1/243 343/702 |

(Continued)

FOREIGN PATENT DOCUMENTS

| | | |
|---|---|---|
| CN | 2077595 U | 5/1991 |
| EP | 0 482 756 | 4/1992 |

(Continued)

OTHER PUBLICATIONS

Extended European Search Report dated May 23, 2018, in corresponding European Patent Application No. 17206618.5.

(Continued)

*Primary Examiner* — Leila Malek
(74) *Attorney, Agent, or Firm* — Staas & Halsey LLP

(57) ABSTRACT

A broadcast receiving apparatus is provided. The broadcast receiving apparatus includes a first cover with a circuit board arranged therein, a second cover coupled onto the first cover, and at least one dipole antenna coupled to the circuit board and including an antenna pattern arranged on an inner surface of the second cover.

19 Claims, 7 Drawing Sheets

(56) References Cited

U.S. PATENT DOCUMENTS

| | | | |
|---|---|---|---|
| 2006/0262744 A1* | 11/2006 | Xu | H04H 20/28 370/328 |
| 2008/0062062 A1* | 3/2008 | Borau | H01Q 1/246 343/844 |
| 2009/0051616 A1 | 2/2009 | Hong et al. | |
| 2012/0001815 A1 | 1/2012 | Wong et al. | |
| 2016/0032302 A1 | 2/2016 | Bae et al. | |
| 2016/0172758 A1 | 6/2016 | Puente Baliarda et al. | |
| 2016/0322700 A1 | 11/2016 | Choon et al. | |
| 2016/0322708 A1 | 11/2016 | Tayfeh Aligodarz et al. | |
| 2016/0323024 A1 | 11/2016 | Murakami et al. | |
| 2016/0329935 A1 | 11/2016 | Singerl et al. | |
| 2016/0330823 A1 | 11/2016 | Hwa et al. | |
| 2018/0076505 A1* | 3/2018 | Hu | H01Q 1/243 |

FOREIGN PATENT DOCUMENTS

| | | |
|---|---|---|
| JP | 3851463 | 9/2006 |
| JP | 2007-251550 | 9/2007 |
| KR | 2002-0034815 | 5/2002 |
| KR | 10-0795674 | 1/2008 |

OTHER PUBLICATIONS

European Office Action dated May 6, 2019 in corresponding European Patent Application No. 17206618.5.

* cited by examiner

BROADCAST RECEIVING APPARATUS

CROSS-REFERENCE TO RELATED APPLICATIONS

This application claims priority from Korean Patent Application No. 10-2017-0014758, filed on Feb. 2, 2017, in the Korean Intellectual Property Office, the disclosure of which is incorporated herein by reference in its entirety.

TECHNICAL BACKGROUND

Apparatuses and methods consistent with the present disclosure relate to a broadcast receiving apparatus, and more particularly, to a broadcast receiving apparatus including an antenna.

BACKGROUND

A broadcast receiving apparatus receives a broadcast signal (hereinafter, referred to as a "signal") from a ground wave antenna through a cable, decodes the received signal, and transmits the signal to a display apparatus such as a television (TV) and a monitor to output content in the form of video and audio. A representative example of the broadcast receiving apparatus is a set-top box (STB).

The broadcast receiving apparatus demodulates a signal of an image, voice, characters, etc. and outputs the signal through an output terminal such as an audio/video (A/V) terminal, and a component terminal, a high definition multimedia interface (HDMI) terminal and the signal output through the broadcast receiving apparatus may be transmitted to a display apparatus through a cable.

In general, a broadcast receiving apparatus receives a signal from a separate data source and, to this end, needs to be connected to a data source through a separate cable, or the like.

For example, a typical broadcast receiving apparatus is connected to an Internet network for performing an Internet protocol television (IPTV) for providing various multimedia functions or an over the top (OTT) service and, to this end, is connected to an externally installed Internet server through a separate cable such as an unshielded twisted pair (UTP) cable.

The typical broadcast receiving apparatus also needs to be connected to an externally installed ground wave antenna to receive ground waves, and additionally needs a separate cable such as a coaxial cable for connection with the external ground wave antenna. Accordingly, the typical broadcast receiving apparatus is disadvantageous in that an installation space is limited due to an external antenna and a cable connected thereto and installation convenience is degraded.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a broadcast receiving apparatus with both a reduced installation space and enhanced installation convenience by installing an external antenna inside the broadcast receiving apparatus.

According to an aspect of the present disclosure, a broadcast receiving apparatus includes a first cover with a circuit board arranged therein, a second cover coupled onto the first cover, and at least one dipole antenna coupled to the circuit board and including an antenna pattern arranged on an inner surface of the second cover.

According to an aspect of the present disclosure, a broadcast receiving apparatus includes a first cover with a circuit board arranged thereon, at least one component on the circuit board, a second cover coupled to the first cover; and a dipole antenna comprising an antenna pattern arranged on an inner surface of the second cover, to receive a radio signal, the dipole antenna is coupled to the circuit board to provide the received radio signal to the at least one component, and the at least one component decodes the received radio signal into data to be output from the broadcast receiving apparatus to a display apparatus that is external to the broadcast receiving apparatus.

The antenna pattern may include a first antenna pattern and a second antenna pattern configured with the same length as a length of the first antenna pattern and the first antenna pattern and the second antenna pattern may be configured as an interdigital structure.

A portion of the first antenna pattern and a portion of the second antenna pattern may be arranged to be adjacent to each other.

The portion of the first antenna pattern and the portion of the second antenna pattern may be arranged to be interlaced with each other.

The first antenna pattern may include a first radiator and a first branch radiator diverged from the first radiator and the second antenna pattern may include a second radiator and a second branch radiator diverged from the second radiator.

A portion of the second radiator, a portion of the first radiator, the second branch radiator, and the first branch radiator may be sequentially arranged in parallel to each other.

Each of the first and second radiators may include a first part, a second part bent from the first part, and a third part bent from the second part, the first branch radiator may be diverged from the second part of the first radiator, and the second branch radiator may be diverged from the second part of the second radiator.

The second part of the first radiator and the second part of the second radiator may be arranged in parallel to each other, and the third part of the second radiator, the third part of the first radiator, the second branch radiator, and the first branch radiator may be sequentially arranged in parallel to each other.

Each of the first and second antenna patterns may include a first path from a fore end of the first part to a fore end of the third part and a second path from the fore end of the first part to fore ends of the first and second branch radiators.

The first path and the second path may be configured in such a way that a length of the first path and a length of the second path are different to receive frequencies in different bands.

The first path may be set to receive a signal in a very high frequency (VHF) band, and the second path may be set to receive a signal in an ultra high frequency (UHF) band.

The length of the first path may be set to 43 cm and the length of the second path may be set to 16 cm.

The first and second radiators may include first and second curve parts curved with the same curvature, the first and second branch radiators may include first and second branch curve parts curved with the same curvature, and the second curve part, the first curve part, the second branch curve part, and the first branch curve part may be sequentially arranged in parallel to each other.

The circuit board may include a first coupling member coupled to a feeding point and a second coupling member coupled to a ground point, and the dipole antenna may contact the first and second coupling members and is thereby coupled to the circuit board.

The first and second coupling members may include a "C" type clip that elastically contacts the first and second antenna patterns, respectively.

The first coupling member may elastically contacts a fore end portion of the first part of the first radiator, and the second coupling member may elastically contact a fore end portion of the first part of the second radiator.

The antenna may be a laser direct structuring (LDS) antenna.

According to an aspect of the present disclosure, a broadcast receiving apparatus includes a first cover with a circuit board arranged thereon, at least one component on the circuit board, a second cover coupled to the first cover, and a dipole antenna arranged on an inner surface of the second cover and including first and second antenna patterns configured as an interdigital structure, to receive a radio signal, the dipole antenna is connected to the circuit board to provide the received radio signal to the at least one component, and the at least one component decodes the received radio signal into data to be output from the broadcast receiving apparatus to a display apparatus that is external to the broadcast receiving apparatus.

The first and second antenna patterns may include first and second radiators and first and second branch radiators diverged inward from the first and second radiators, respectively, a portion of the first radiator may be arranged between a portion of the second radiator and the second branch radiator, and the second branch radiator may be arranged between the portion of the first radiator and the first branch radiator.

The dipole antenna may be a laser direct structuring (LDS) antenna.

According to an aspect of the present disclosure, a set-top box includes a first cover, a circuit board on the first cover, at least one component on the circuit board, a second cover coupled to the first cover, a dipole antenna, having first and second antenna patterns arranged as an interdigital structure, arranged on an inner surface of the second cover, to receive a radio signal, the dipole antenna being coupled to the circuit board to provide the received radio signal to the at least one component, and the at least one component to decode the received radio signal into audio and video data, and a signal outputter to output the audio and video data from the set-top box to a display apparatus that is external to the set-top box.

Additional and/or other aspects and advantages of the invention will be set forth in part in the description which follows and, in part, will be obvious from the description, or may be learned by practice of the invention.

BRIEF DESCRIPTION OF THE DRAWING

The above and/or other aspects of the present disclosure will be more apparent by describing certain exemplary embodiments of the present disclosure with reference to the accompanying drawings, in which.

DETAILED DESCRIPTION

Figure 1:
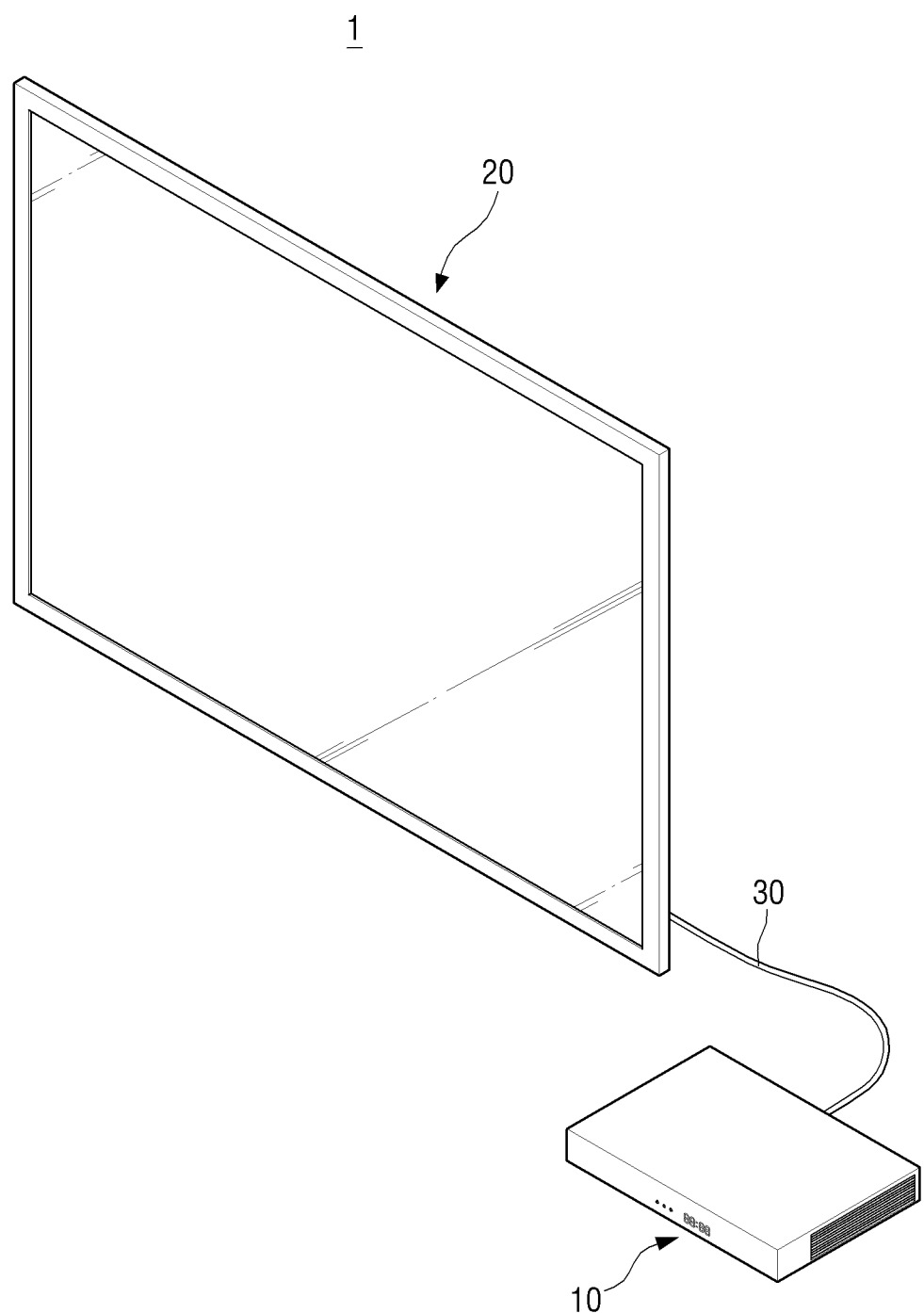
FIG. 1 is a diagram showing a broadcast receiving system including a broadcast receiving apparatus and a display apparatus according to an exemplary embodiment of the present disclosure.

Certain exemplary embodiments of the present disclosure will now be described in greater detail with reference to the accompanying drawings. The exemplary embodiments of the present disclosure will be described with reference to most appropriate exemplary embodiments to understand the technical features of the present disclosure, the technical features of the present disclosure is not limited by the described exemplary embodiments, and the present disclosure is embodied as exemplary embodiments to be described below.

Accordingly, various modifications may be made to a technical range of the present disclosure through exemplary embodiments to be described below and the modified exemplary embodiment is within the technical scope of the present disclosure. In addition, with regard to reference numeral of the accompanying drawings for better understanding of the following exemplary embodiments of the present disclosure, related components among components that perform the same function in each exemplary embodiment are denoted by the same or similar reference numerals. In addition, in the drawings, for better understanding of the following exemplary embodiments of the present disclosure, some components are exaggerated, but not on an actual scale.

FIG. 1 is a diagram showing a broadcast receiving system 1 including a broadcast receiving apparatus 10 and a display apparatus 20 according to an exemplary embodiment of the present disclosure.

As shown in FIG. 1, the broadcast receiving apparatus 10 and the display apparatus 20 may be connected to each other through a cable 30 and may transmit a signal of the broadcast receiving apparatus 10 to the display apparatus 20.

As shown in FIG. 1, the broadcast receiving apparatus 10 may be a set-top box (STB) and, hereinafter, an example in which the broadcast receiving apparatus 10 is a STB will be described.

The broadcast receiving apparatus 10 may decode an externally received signal into decoded data, and provide the decoded data to the display apparatus 20 through the cable 30, so that the display apparatus 20 may thereby output various contents including video and audio.

A signal received through the broadcast receiving apparatus 10 may include a signal of various contents such as a webpage, a game, and video-on-demand (VOD) as well as a signal general broadcast content and, thereby, the display apparatus 20 may output various types of contents.

The display apparatus 20 may be a TV, a monitor, or the like, for displaying an image and may include any one of a liquid crystal display (LCD) panel, a light emitting diode (LED) panel, and an organic light emitting diode (OLED) panel.

The display apparatus 20 may include an audio device to reproduce an audio signal received through the broadcast receiving apparatus 10.

The display apparatus 20 may include only a minimum number of components for outputting a signal transmitted from the broadcast receiving apparatus 10 in the form of video and audio. For example, a plurality of components including, for example, in a controller, a manipulator, a power source, and so on of the display apparatus 20 may be arranged inside the broadcast receiving apparatus 10.

Thereby, an operation of the display apparatus 20 may be controlled through the cable 30 connected to the broadcast receiving apparatus 10. For example, the broadcast receiving apparatus 10 may transmit data, a control signal, power, and so on for an operation of the display apparatus 20 as well as a signal related to audio and video to the display apparatus 20 through the cable 30.

As such, the number of components arranged inside the display apparatus 20 may be minimized and the display apparatus 20 may be connected to the separate broadcast receiving apparatus 10 through the cable 30, thereby configuring an ultra thin type system.

Figure 2:
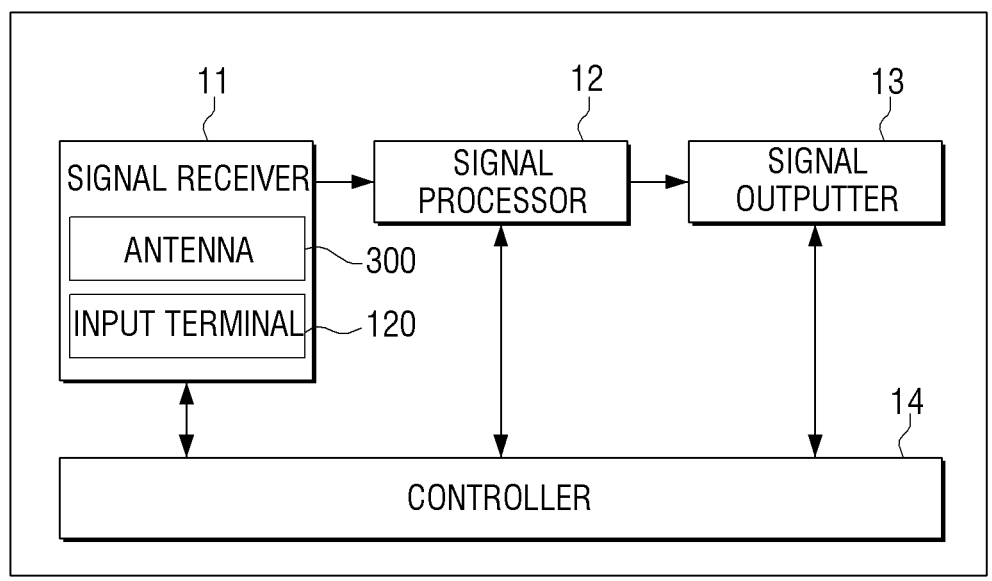
FIG. 2 is a schematic block diagram showing a configuration of the broadcast receiving apparatus shown in FIG. 1.

FIG. 2 is a schematic block diagram showing a configuration of the broadcast receiving apparatus 10 shown in FIG. 1.

The broadcast receiving apparatus 10 may include a signal receiver 11, a signal processor 12, a signal outputter 13, and a controller 14.

The signal receiver 11 may externally receive a signal of terrestrial broadcast, cable broadcast, satellite broadcast, and so on. The signal received through the signal receiver 11 may be an analog type or digital type signal.

As described above, the signal receiver 11 may transmit and receive various types of data, a control signal, and so on as well as a general broadcast signal.

Thereby, the broadcast receiving system 1 including the broadcast receiving apparatus 10 and the display apparatus 20 may provide various multimedia contents based on bidirectional communication such as an Internet protocol television (IPTV) and an over the top (OTT) service as well as a function of outputting the received broadcast signal.

The signal receiver 11 is a component for externally transmitting and receiving a signal and, thus, may be configured to additionally receive a control signal transmitted from a separate remote controller. For example, the signal receiver 11 may further include an infrared receiver and, thus, may receive an infrared signal transmitted from a general remote controller, and a user may remotely control the broadcast receiving apparatus 10 and the display apparatus 20 through a remote controller. The control signal transmitted from the remote controller may be various types of radio signals as well as an infrared signal and the signal receiver 11 may be configured to receive various types of radio signals transmitted from a remote controller.

As shown in FIG. 2, the signal receiver 11 may include an antenna 300 and an input terminal 120.

The antenna 300 may transmit and receive a radio signal such as a radio frequency (RF) signal.

The antenna 300 may transmit various types of radio signals via, for example, a ground wave, long term evolution (LTE), long term evolution-advanced (LTE-A), code division multiple access (CDMA), Bluetooth, WIFI, global positioning system (GPS), wireless LAN, infrared communication, ultra wideband (UWB), Zigbee, near field communication (NFC), and so on and the antenna 300 may include a wideband antenna or a plurality of antennas to transmit and receives a radio signal in various frequency bands.

A detailed configuration and function of the antenna 300 will be described below.

The input terminal 120 may be connected to an external device for transmitting a signal, data, and so on through a separate cable and the signal transmitted from the external device may be received by the signal receiver 11 through the input terminal 120.

The input terminal 120 may include a plurality of input terminals and the plurality of input terminals 120 may include a universal serial bus (USB) connector, an RJ-45 connector, an RJ-11 connector, a high definition multimedia interface (HDMI) connector, a digital video/visual interface (DVI) connector, a mobile high-definition link (MHL) connector, an optical connector, or the like.

For example, the plurality of input terminals 120 may include an RJ-45 connector and the RJ-45 connector may be connected to an external Internet server through an unshielded twisted pair (UTP) cable. Thereby, the broadcast receiving apparatus 10 may be connected to the Internet to transmit and receive data in real time and may provide a bidirectional television service function such as VOD, web surfing, and home shopping through the display apparatus 20.

The plurality of input terminals 120 may be connected to various external devices such as a computer, a notebook computer, a smart pad, a portable terminal, and a DVD player through a cable and a signal input to the input terminals 120 from various external devices may be transmitted to the display apparatus 20 through the signal processor 12 and the signal outputter 13.

The signal processor 12 may divide a signal received from the signal receiver 11 into video and audio data, and so on. In addition, the signal processor 12 may modulate the video and audio data according to a predetermined standard and transmit the video and audio data to the signal outputter 13.

The signal outputter 13 may output the video and audio data modulated by the signal processor 12, and the cable 30 may connect a connector of the signal outputter 13 and a connector of the display apparatus 20 to transmit the video and audio data output from the signal outputter 13 to the display apparatus 20.

Thereby, the display apparatus 20 may output the signal received by the signal receiver 11 as various contents in the form of video and audio.

However, the signal processor 12 and the signal outputter 13 may be the same as or similar to a configuration of a typical broadcast receiving apparatus and, thus, a detailed description thereof will be omitted.

The broadcast receiving apparatus 10 may include the controller 14 for controlling the signal receiver 11, the signal processor 12, and the signal outputter 13. As described above, the controller 14 may control an operation of the broadcast receiving apparatus 10 and, simultaneously, may also control an operation of the display apparatus 20 connected through the cable 30. Accordingly, the display apparatus 20 does not include a separate controller and, thus, a thickness of the display apparatus 20 may be further thinned.

Figure 3:
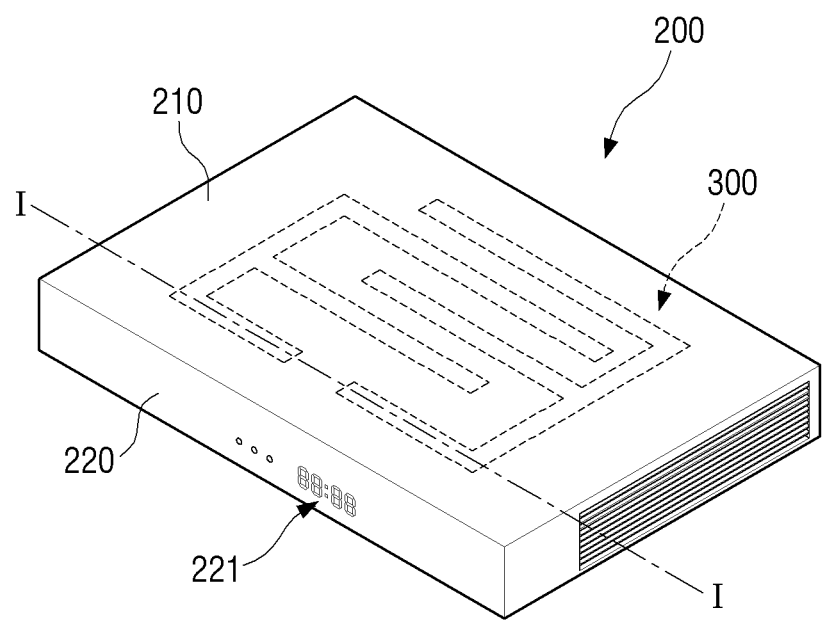
FIG. 3 is a perspective view of the broadcast receiving apparatus shown in FIG. 1.
Figure 4:
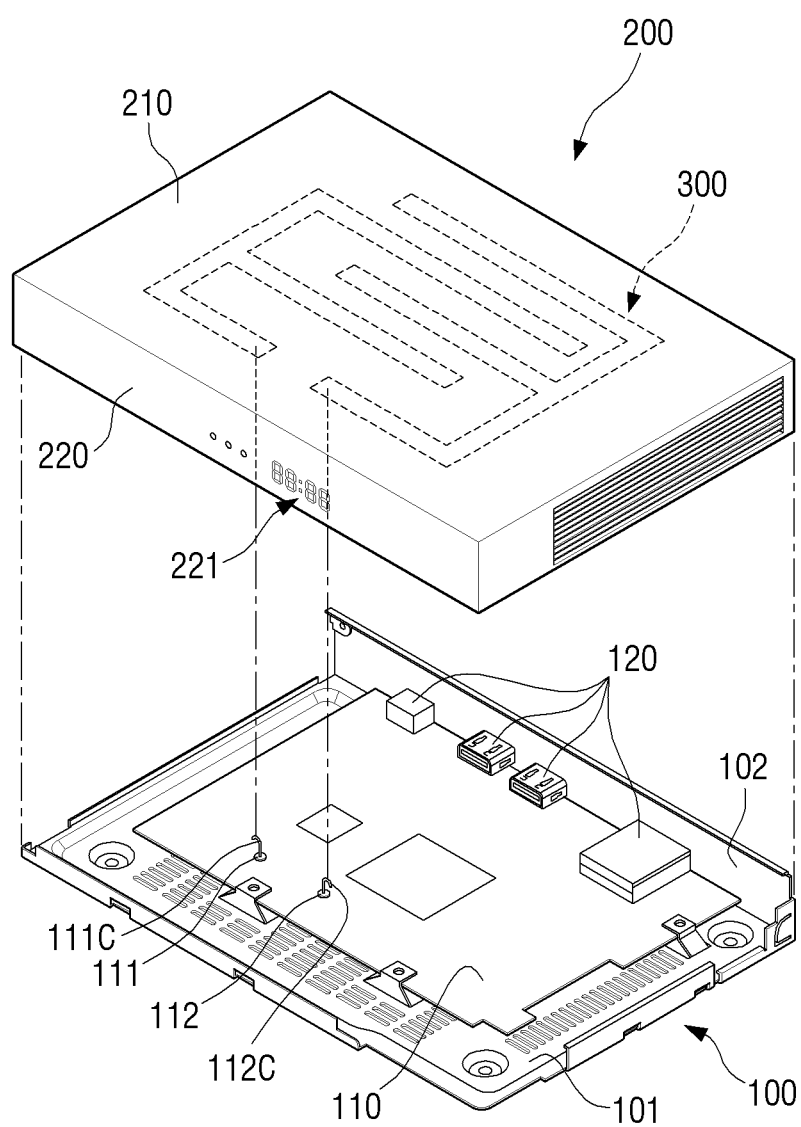
FIG. 4 is an exploded perspective view of the broadcast receiving apparatus shown in FIG. 3.

FIG. 3 is a perspective view of the broadcast receiving apparatus 10 shown in FIG. 1. FIG. 4 is an exploded perspective view of the broadcast receiving apparatus 10 shown in FIG. 3.

Hereinafter, with reference to FIGS. 3 and 4, a configuration and structure of the broadcast receiving apparatus 10 will be described in detail.

As shown in FIGS. 3 and 4, the broadcast receiving apparatus 10 may include a first cover 100 and a second cover 200 that form an outer appearance.

A circuit board 110 may be disposed on the first cover 100, and the second cover 200 may be coupled to an upper portion of the first cover 100.

The second cover 200 may be coupled to the upper portion of the first cover 100 to cover the circuit board 110 and a plurality of components coupled to the circuit board 110.

The circuit board 110 may be a printed circuit board (PCB) and may be a flexible printed circuit board (FPCB).

Various electronic components for an operation of the broadcast receiving apparatus 10 may be installed on the circuit board 110, and the plurality of input terminals 120 may be arranged at one side of the broadcast receiving apparatus 10 as shown in FIG. 4.

The plurality of input terminals 120 may be disposed on the circuit board 110 to be adjacent to a rear surface portion of the broadcast receiving apparatus 10, and the plurality of input terminals 120 disposed on the rear surface portion of the broadcast receiving apparatus 10 may be connected to various external devices through a separate cable, as described above.

A plurality of components included in the signal processor 12, the signal outputter 13, and the controller 14 may be installed on the circuit board 110, and a power supply (not shown) for driving the broadcast receiving apparatus 10 and a storage (not shown) for storing a program for driving the broadcast receiving apparatus 10 and received signals and data may be coupled to the circuit board 110.

The second cover 200 may include a second plate 210 facing a first plate 101 of the first cover 100 and a lateral wall portion that surrounds an edge of the second plate 210.

The lateral wall portion of the second cover 200 may surround an edge of the first plate 101 of the first cover 100 and, therethrough, the circuit board 110 and components installed on the circuit board 110 may be accommodated in the second cover 200.

A display portion 221 for displaying an operation state of the broadcast receiving apparatus 10 may be disposed on a front surface 220 of the second cover 200, included in the lateral wall portion and an inputter (not shown) for receiving a user command may be disposed on the display portion 221.

The display portion 221 disposed on the front surface 220 of the second cover 200 may display a type of a signal received by the broadcast receiving apparatus 10, information on a channel, and information on operation states of the broadcast receiving apparatus 10 and the display apparatus 20.

In addition, the broadcast receiving apparatus 10 may display a type of a signal received by the broadcast receiving apparatus 10, information on a channel, and information on operation states through the display apparatus 20 without a separate display portion.

As shown in FIGS. 3 and 4, the broadcast receiving apparatus 10 may include at least one antenna 300 that is disposed on the second cover 200 and is connected to the circuit board 110.

The antenna 300 may be disposed on an inner surface of the second cover 200 and, in more detail, the antenna 300 may be arranged on the inner surface of the second plate 210 to face the circuit board 110.

The antenna 300 may be arranged on the second cover 200 of the broadcast receiving apparatus 10 to easily receive an external radio signal.

For convenience of description, in FIGS. 3 and 4, the antenna 300 arranged on the inner surface of the second plate 210 is indicated by dotted lines.

As shown in FIGS. 3 and 4, the antenna 300 may include a pair of antenna patterns 31 and 32 (refer to FIG. 5) and the antenna 300 may be a dipole antenna including the pair of antenna patterns 31 and 32.

The circuit board 110 may include a feeding point 111 and a ground point 112, and the feeding point 111 and the ground point 112 may be disposed on an upper surface of the circuit board 110, facing the antenna 300.

First and second coupling members 111C and 112C may be coupled to the feeding point 111 and the ground point 112, respectively.

The first coupling member 111C coupled to the feeding point 111 may be connected to the antenna 300 to feed electricity to the antenna 300. To this end, the first coupling member 111C may be formed of a conductive metallic material such as copper, silver, and gold.

The second coupling member 112C coupled to the ground point 112 may be connected to the antenna 300 to ground the antenna 300. To this end, the second coupling member 112C may also be formed of a conductive metallic material such as copper, silver, and gold.

In more detail, the first coupling member 111C coupled to the feeding point 111 may be connected to any one of the pair of antenna patterns 31 and 32 to feed electricity, and the second coupling member 112C coupled to the ground point 112 may be connected to another of the pair of antenna patterns 31 and 32, which is not connected to the first coupling member 111C, to ground the connected antenna pattern.

To this end, the pair of antenna patterns 31 and 32 may resonate at a predetermined resonance frequency to radiate an electromagnetic wave and, therethrough, signals may be transmitted.

The antenna 300 including the aforementioned first and second antenna patterns 31 and 32 may function as a dipole antenna. To this end, a total length of the first antenna pattern 31 and the second antenna pattern 32 may be configured as $\lambda/2$ of a receivable frequency band and each length of the first and second antenna patterns 31 and 32 may be configured as $\lambda/4$ of the receivable frequency band.

However, the configuration in which the first and second antenna patterns 31 and 32 function as a dipole antenna is the same as or similar to the prior art and, thus, a detailed description thereof will be omitted.

As shown in FIG. 4, when the second cover 200 is decoupled from the first cover 100, the antenna 300 arranged on the inner surface of the second cover 200 and the first and second coupling members 111C and 112C arranged on the circuit board 110 may be spaced apart from each other and, when the second cover 200 and the first cover 100 are coupled, the first and second antenna patterns 31 and 32 may come in contact with the first and second coupling members 111C and 112C to be electrically connected to the circuit board 110.

Therethrough, the signals and data received by the antenna 300 may be transmitted to the signal processor 12, and the signal decoded through the signal processor 12 may be transmitted to the display apparatus 20 from the signal outputter 13 through the cable 30.

Figure 5:
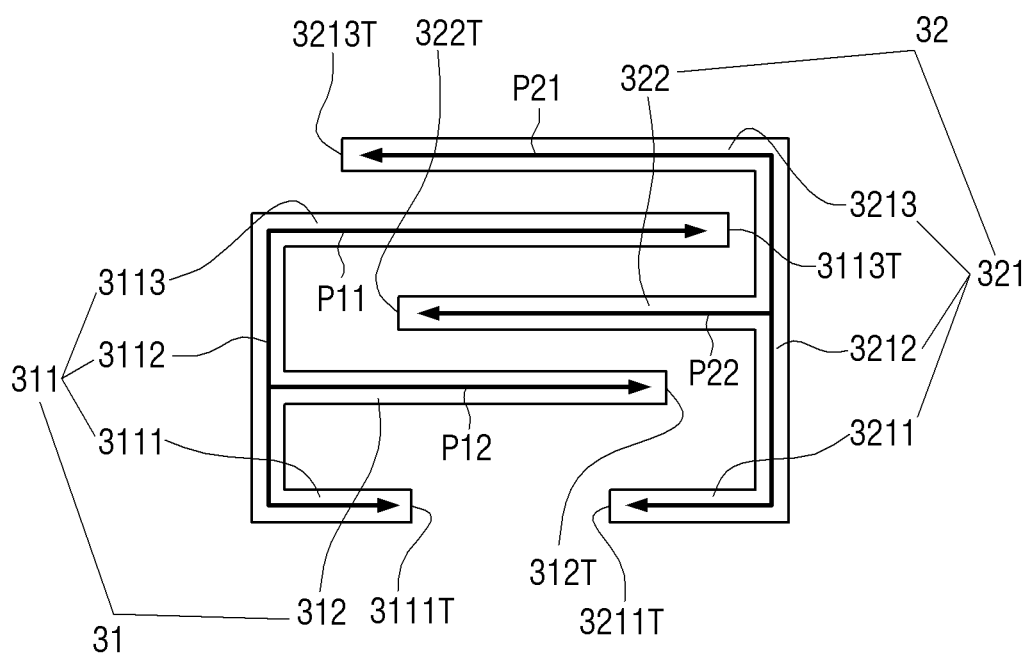
FIG. 5 is a plan view of an antenna shown in FIG. 4.

FIG. 5 is a plan view of the antenna 300 shown in FIG. 4.

Hereinafter, a detailed configuration and function of the antenna 300 will be described in detail with reference to FIG. 5.

As described above, the antenna 300 may be a dipole antenna including the pair of antenna patterns 31 and 32.

As shown in FIG. 5, the pair of antenna patterns 31 and 32 included in the antenna 300 may include the first antenna pattern 31 and the second antenna pattern 32 configured with the same length as the first antenna pattern 31.

Therethrough, the first antenna pattern 31 and the second antenna pattern 32 may function as a dipole antenna.

A portion of the first antenna pattern 31 and a portion of the second antenna pattern 32 may be arranged to be adjacent to each other on the inner surface of the second cover 200 and, in more detail, the portion of the first antenna pattern 31 and the portion of the second antenna pattern 32 may be arranged to be interlaced with each other. That is, the first antenna pattern 31 and the second antenna pattern 32 may be interlaced with each other on the second plate 210 and may be configured as an interdigital structure.

A length of the antenna 300 may be determined according to a wavelength of a signal to be received through the antenna 300 and, accordingly, as a wavelength of the signal to be received through the antenna 300 is increased, the length of the antenna 300 for receiving the signal may also be increased.

However, according to a recent tendency toward a small-sized, thinned, and compact electronic device, the size and shape of the broadcast receiving apparatus 10 may also be small-sized, thinned, and compact.

Accordingly, the portions of the first antenna pattern 31 and the second antenna pattern 32 may be interlaced with each other and may be configured as an interdigital structure and, thus, the second cover 200 with the first and second antenna patterns 31 and 32 arranged thereon may be small-sized and, simultaneously, reduction in reception efficiency of the first and second antenna patterns 31 and 32 may be minimized. Thereby, signals may be smoothly received through the antenna 300 installed in the broadcast receiving apparatus 10 without a separate cable and the broadcast receiving apparatus 10 may also be compact.

To this end, the first antenna pattern 31 and the second antenna pattern 32 may be formed by bending portions of a linear pattern with a long shape and the bent portions of the second antenna pattern 32 may be arranged between the bent portions of the first antenna pattern 31, thereby minimizing an area on the second cover 200, occupied by the first antenna pattern 31 and the second antenna pattern 32.

In addition, the antenna 300 including the first and second antenna patterns 31 and 32 may include a dual band antenna to receive a frequency of a plurality of bandwidths.

In detail, the first antenna pattern 31 may include a first radiator 311 and a first branch radiator 312 diverged from the first radiator 311 and the second antenna pattern 32 may include a second radiator 321 and a second branch radiator 322 diverged from the second radiator 321.

The first branch radiator 312 and the second branch radiator 322 may be diverged inward from the first radiator 311 and the second radiator 321, respectively and may be diverged in a direction toward a center of the antenna 300.

The lengths of the first and second radiators 311 and 321 may be set to $\lambda/4$ of a first band frequency as a reception target.

The first and second branch radiators 312 and 322 diverged from the first and second radiators 311 and 321 may share portions of the first and second radiators 311 and 321 with the first and second radiators 311 and 321 and, accordingly, the sum of lengths of the shared radiators of the first and second radiators 311 and 321 and the first and second branch radiators 312 and 322 may be set to $\lambda/4$ of a second band frequency as a reception target, respectively.

Thereby, the first and second antenna patterns 31 and 32 may function as a dual band antenna for simultaneously receiving the first and second band frequencies.

The first and second antenna patterns 31 and 32 may include additional branch radiators in addition to the aforementioned first and second branch radiators 312 and 322 and, therethrough, a plurality of band frequencies may be simultaneously received.

As described above, the length of the antenna 300 may be determined according to a wavelength of a signal as a reception target and, accordingly, the lengths of the first and second radiators 311 and 321 and the first and second branch radiators 312 and 322 may be changed according to wavelengths of the first and second band frequencies.

The reception efficiency of signals received from the first and second radiators 311 and 321 and the first and second branch radiators 312 and 322 may be maximum when the first and second radiators 311 and 321 and the first and second branch radiators 312 and 322 are shaped like a straight line but, when the first and second radiators 311 and 321 and the first and second branch radiators 312 and 322, which are arranged on the inner surface of the second cover 200, are shaped like a straight line, a diameter of the second plate 210 needs to be greater than the sum of the length of the first radiator 311 and the length of the second radiator 321.

Accordingly, to minimize the size of the second plate 210 arranged on the first and second antenna patterns 31 and 32 functioning as a dual band and to, simultaneously, minimize reduction in reception efficiency of the first and second antenna patterns 31 and 32, the first and second antenna patterns 31 and 32 may be configured as an interdigital structure.

In detail, as shown in FIG. 5, the first radiator 311 may include a first part 3111, a second part 3112 bent from the first part 3111, and a third part 3113 bent from the second part 3112 and the second radiator 321 may include a first part 3211, a second part 3212 bent from the first part 3211, and a third part 3213 bent from the second part 3212.

The first branch radiator 312 may be diverged on the second part 3112 of the first radiator 311 and the second branch radiator 322 may be diverged on the second part 3212 of the second radiator 321.

For example, as shown in FIG. 5, the first antenna pattern 31 and the second antenna pattern 32 may be shaped like a plurality of alphabets "E" that are interlaced to face each other and, thereby configuring the compact second cover 200 with the first and second antenna patterns 31 and 32 arranged on the inner surface thereof.

The second part 3112 of the first radiator 311 and the second part 3212 of the second radiator 321 may be arranged in parallel to each other.

The first part 3111, the first branch radiator 312, and the third part 3113 of the first radiator 311 may be formed to extend in a perpendicular direction toward the second antenna pattern 32 from the second part 3112 and the first part 3211, the second branch radiator 322, and the third part 3213 of the second radiator 321 may be formed to extend in a perpendicular direction toward the first antenna pattern 31 from the second part 3212.

The third part 3213 of the second radiator 321, the third part 3113 of the first radiator 311, the second branch radiator 322, and the first branch radiator 312 may be sequentially arranged in parallel to each other. Thereby, a portion of the second radiator 321, a portion of the first radiator 311, the second branch radiator 322, and the first branch radiator 312 may be sequentially arranged in parallel to each other.

Although FIG. 5 illustrates an example in which portions of the first and second radiators 311 and 321 are perpendicularly bent, an angle at which each portion of the first and second radiators 311 and 321 is bent may be changed to various angles for minimizing the size of the second plate 210 with the first and second antenna patterns 31 and 32 arranged thereon and for simultaneously maintaining appropriate reception efficiency of the antenna 300.

In addition, intervals of the third part 3213 of the second radiator 321, the third part 3113 of the first radiator 311, the second branch radiator 322, and the first branch radiator 312, which are sequentially arranged in parallel to each other, may be configured to be equal, thereby effectively preventing interference of electromagnetic waves that may be radiated when the third part 3213 of the second radiator 321, the third part 3113 of the first radiator 311, the second branch radiator 322, and the first branch radiator 312 are adjacently arranged. Thereby, although the first antenna pattern 31 and the second antenna pattern 32 are arranged to be interlaced with each other, reduction in reception efficiency of a signal may be prevented.

However, the shape and arrangement of the first antenna pattern 31 and the second antenna pattern 32 that are arranged as an interdigital structure may be changed in various ways to configure a compact shape of the second cover 200 and to simultaneously minimize reduction in reception efficiency of a signal received through the antenna 300.

For example, the first and second antenna patterns 31 and 32 may be coupled to the inner surface of the second cover 200 to configure a meander structure or a comb structure and, thus, may easily receive a frequency in various bands on the compact second cover 200.

As described above, the first antenna pattern 31 may include the first radiator 311 and the first branch radiator 312 diverged from the first radiator 311 and the second antenna pattern 32 may include the second radiator 321 and the second branch radiator 322 diverged from the second radiator 321 to function as a dual band antenna that simultaneously receives the first and second band frequencies.

In more detail, the first and second antenna patterns 31 and 32 may include first paths P11 and P21 from fore ends 3111T and 3211T of the first parts 3111 and 3211 to fore ends 3113T and 3213T of the third parts 3113 and 3213 and second paths P12 and P22 from the fore ends 3111T and 3211T of the first parts 3111 and 3211 to fore ends 312T and 322T of the first and second branch radiators 312 and 322.

A length of the first path P11 of the first antenna pattern 31 and a length of the first path P21 of the second antenna pattern 32 may be set to be equal and a length of the second path P12 of the first antenna pattern 31 and a length of the second path P22 of the second antenna pattern 32 may be set to be equal.

To receive frequencies in different bands through the first paths P11 and P21 and the second paths P12 and P22, a length of the first paths P11 and P21 and a length of the second paths P12 and P22 may be set to be different.

A length of each of the first paths P11 and P21 of the first and second antenna patterns 31 and 32 that function as a dual-band dipole antenna may be set to $\lambda/4$ of a first band frequency and a length of each of the second paths P12 and P22 may be set to $\lambda/4$ of the second band frequency different from the first band frequency.

For example, the antenna 300 may receive a very high frequency (VHF) (e.g., 174 MHz to 223 MHz) as the first band frequency and may receive an ultra high frequency (UHF) band frequency (e.g., 470 MHz to 860 MHz) as the second band frequency.

The first paths P11 and P21 may be set to receive a signal in a VHF band and the second paths P12 and P22 may be set to receive a signal in a UHF band and, accordingly, the first paths P11 and P21 may be set to be longer than the second paths P12 and P22.

In detail, a length of each of the first paths P11 and P21 may be set to $\lambda/4$ of the VHF band frequency and, for example, may be set to 43 cm. A length of each of the second paths P12 and P22 may be set to $\lambda/4$ of the UHF band frequency and, for example, may be set to 16 cm.

The second paths P12 and P22 share portions of the first paths P11 and P21, i.e., portions of the first and second radiators 311 and 321 and, thus, a total length of the first and second antenna patterns 31 and 32 that function as a dual band antenna may be reduced. That is, in the aforementioned example, a length of the second branch radiators 312 and 322 may be set to be equal to or less than 16 cm.

The first and second band frequency may be various types of radio signal using LTE, LTE-A, CDMA, Bluetooth, WIFI, GPS, wireless LAN, infrared communication, UWB, Zigbee, NFC, and so on in addition to the aforementioned VHF and UHF band signal. However, lengths of the first paths P11 and P21 and the second paths P12 and P22 may be changed according to a wavelength of a signal to be received through the antenna 300 and, accordingly, shapes of the first and second antenna patterns 31 and 32 may also be changed.

The antenna 300 including the first and second antenna patterns 31 and 32 that function as a dual-band dipole antenna may be a laser direct structuring (LDS) antenna. Accordingly, patterns with various shapes may be designed on the second cover 200 using a laser and the designed pattern may be plated with conductive metal such as copper and nickel and, accordingly, the first and second antenna patterns 31 and 32 with various shapes may be easily embodied on the second cover 200.

According to the aforementioned embodiment of the present disclosure, although the antenna 300 is a dipole antenna including the first and second antenna patterns 31 and 32, the first and second antenna patterns 31 and 32 may each be configured as a monopole antenna for receiving signals in different bands.

For example, a length of the first radiator 311 of the first antenna pattern 31 may be set as $\lambda/4$ of the first band frequency and a length of the second radiator 321 of the second antenna pattern 32 may be set as $\lambda/4$ of the second band frequency, the sum of a length of the first branch radiator 312 included in the second path P12 of the first antenna pattern 31 and a length of a portion of the first radiator 311 may be set as $\lambda/4$ of the third band frequency, and the sum of a length of the second branch radiator 322 included in the second path P22 of the second antenna pattern 32 and a length of a portion of the second radiator 321 may be set as $\lambda/4$ of a fourth band frequency and, accordingly, the first to fourth band frequencies may be simultaneously received through the antenna 300.

To operate the first and second antenna patterns 31 and 32 as a dual-band monopole antenna, respectively, the first and second antenna patterns 31 and 32 may received electricity from the circuit board 110 and, simultaneously, may be grounded to a ground surface of the circuit board 110.

The aforementioned first and second antenna patterns 31 and 32 that operate as a dual-band monopole antenna may include a planar inverted antenna (PIFA).

The antenna 300 including the first and second antenna patterns 31 and 32 may be replaced by antennas with various shapes and types, which are arranged on the inner surface of the second cover 200 and, simultaneously, configure the compact size of the broadcast receiving apparatus 10 as well as the aforementioned type of antenna.

Figure 6:
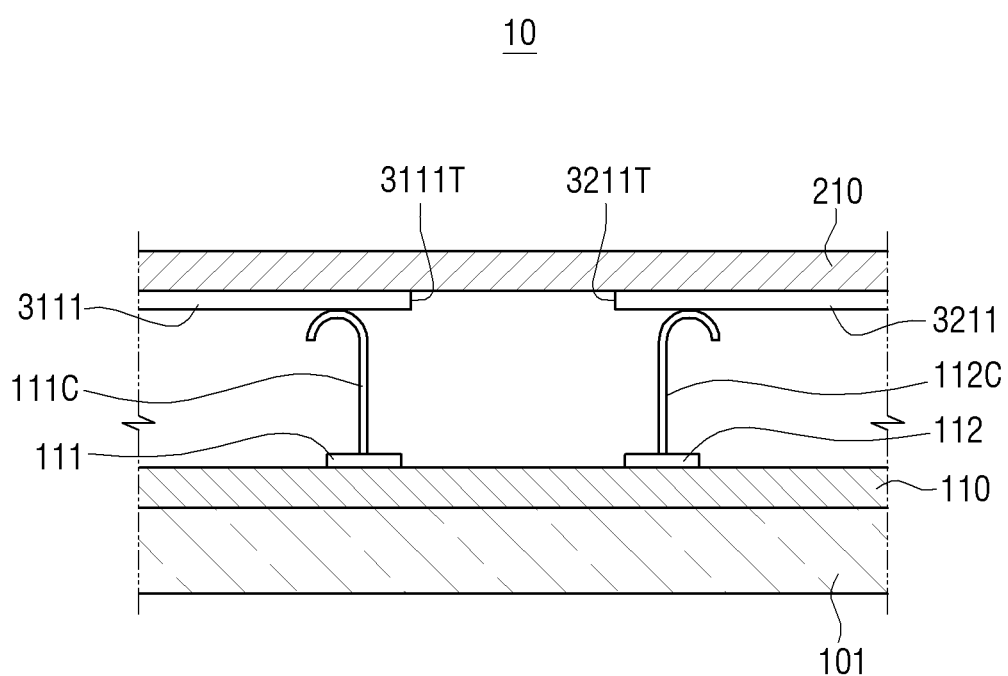
FIG. 6 is a cross-sectional view of the broadcast receiving apparatus taken along a line I-I shown in FIG. 3.

FIG. 6 is a cross-sectional view of the broadcast receiving apparatus 10 taken along a line I-I shown in FIG. 3.

As shown in FIG. 6, the first coupling member 111C coupled to the feeding point 111 of the circuit board 110 and the second coupling member 112C coupled to the ground point 112 may include a "C" type clip that is shaped like an approximate alphabet "C" and formed of a metallic material.

The first and second coupling members 111C and 112C may protrude in an upward direction toward the first and second antenna patterns 31 and 32 arranged on the feeding point 111 and the ground point 112 and, accordingly, the second cover 200 may be coupled to the first cover 100 to allow the first and second coupling members 111C and 112C to elastically contact the first and second antenna patterns 31 and 32. Thereby, the antenna 300 and the circuit board 110 may be electrically connected.

In addition, the first and second coupling members 111C and 112C may include an elastic "C" type clip to fixedly maintain contact with the first and second radiators 311 and 321.

The first coupling member 111C may elastically contact a fore end portion adjacent to the fore end 3111T of the first part 3111 of the first radiator 311 and the second coupling member 112C may elastically contact a fore end portion adjacent to the fore end 3211T of the first part 3211 of the second radiator 321.

However, the aforementioned first and second coupling members 111C and 112C may be replaced by various shapes (e.g., a "Z" type clip and a "t" type clip) for fixedly maintaining contact with the first and second radiators 311 and 321 as well as the shape of the "C" type clip shown in FIG. 6.

The first and second antenna patterns 31 and 32 arranged on the inner surface of the second plate 210 may also be arranged on an inner surface of the lateral wall portion surrounding an edge of the second plate 210.

For example, portions of the first and second antenna patterns 31 and 32 arranged on the inner surface of the second plate 210 may be bent from the inner surface of the second plate 210 to extend along the inner surface of the lateral wall portion. Thereby, the broadcast receiving apparatus 10 including the second cover 200 may be configured to be further compact while maintaining lengths of the first and second antenna patterns 31 and 32

The first and second antenna patterns 31 and 32 arranged on the second plate 210 may extend to the lateral wall portion of the second cover 200 and, accordingly, each fore end of the first and second antenna patterns 31 and 32 arranged on the lateral wall portion may be coupled directly to the circuit board 110 without a coupling member.

Figure 7:
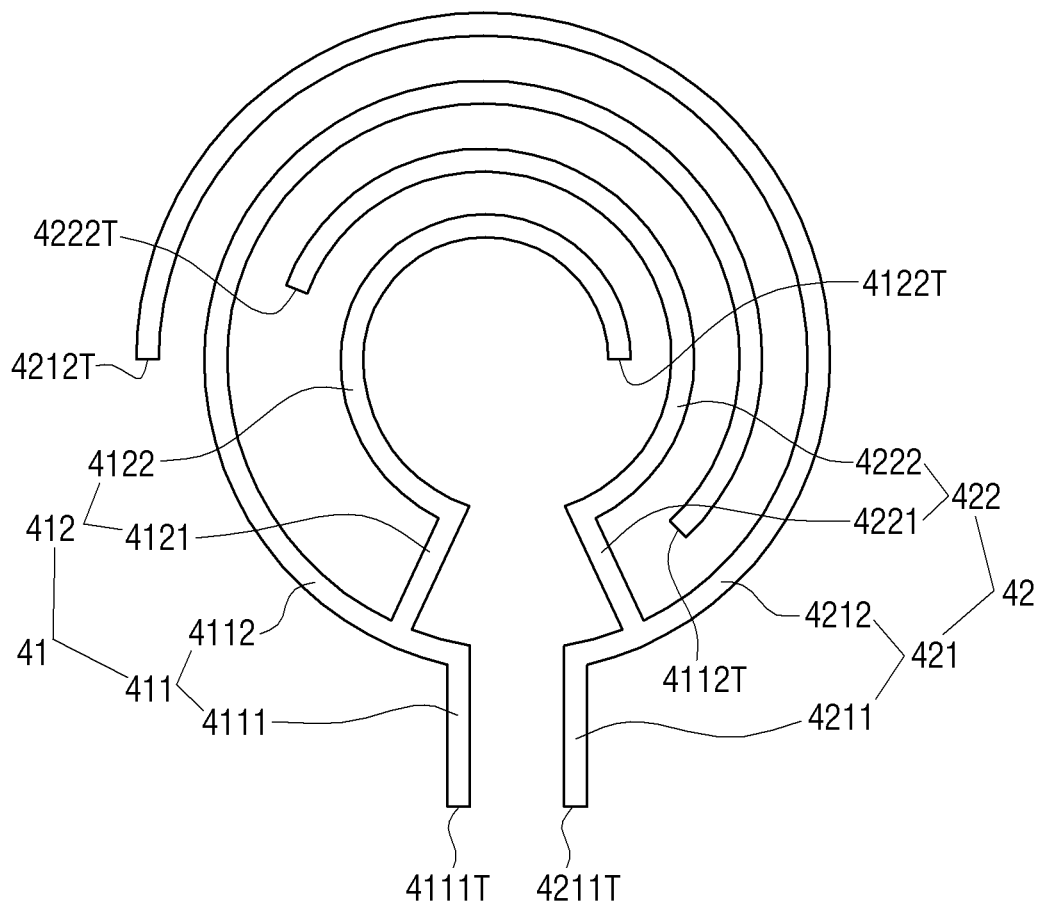
FIG. 7 is a plan view showing an antenna according to another embodiment of the present disclosure.

FIG. 7 is a plan view showing an antenna 400 according to another embodiment of the present disclosure.

As shown in FIG. 7, the antenna 400 arranged on an inner surface of the second cover 200 may be configured with a shape containing a curve.

The antenna 400 may be a dipole antenna including a pair of antenna patterns 41 and 42 and the pair of antenna patterns 41 and 42 may include the first antenna pattern 41 and the second antenna pattern 42 configured with the same length as the first antenna pattern 41.

The antenna 400 according to another exemplary embodiment of the present disclosure may be configured as a dual-band antenna similarly to the antenna 300 according to an exemplary embodiment of the present disclosure shown in FIG. 5 and the first antenna pattern 41 and the second antenna pattern 42 may be interlaced with each other on the second plate 210 and may be configured as an interdigital structure.

Hereinafter, with regard to a description of a configuration and structure of the antenna 400 shown in FIG. 7, a similar or repeated description of the antenna 300 shown in FIG. 5 will be omitted here.

As shown in FIG. 7, the first antenna pattern 41 may include a first radiator 411 that is partially curved and a first branch radiator 412 that is diverged from the first radiator 411 and is partially curved and the second antenna pattern 42 may include a second radiator 421 that is partially curved and a second branch radiator 422 that is diverged from the second radiator 421 and is partially curved.

The first and second branch radiators 412 and 422 may be diverged in an inward direction of the curved first and second radiators 411 and 421 and, accordingly, the first and second radiators 411 and 421 may surround the first and second branch radiators 412 and 422 therein. Accordingly, the second cover 200 with the first and second antenna patterns 41 and 42 therein may be configured to be further compact.

The first and second radiators 411 and 421 may include first and second straight parts 4111 and 4211 with a straight shape and first and second curve parts 4112 and 4212 connected to the first and second straight parts 4111 and 4211, respectively.

The first and second antenna patterns 41 and 42 may include a first path from fore ends 4111T and 4211T of the first and second straight parts 4111 and 4211 to fore ends 4112T and 4212T of the first and second curve parts 4112 and 4212 and a second path from the fore ends 4111T and 4211T of the first and second straight parts 4111 and 4211 to fore ends 4122T and 4222T of first and second branch curve parts 4122 and 4222, respectively.

The first straight part 4111 and the second straight part 4211 may be arranged to be symmetrical to each other and the first curve part 4112 and the second curve part 4212 may be curved with the same curvature to face each other at a constant interval.

In addition, the first branch radiator 412 may include a first branch straight part 4121 that is diverged inward on the first curve part 4112 and is shaped like a straight line and the first branch curve part 4122 connected to the first branch straight part 4121, and the second branch radiator 422 may include a second branch straight part 4221 that is diverged inward on the second curve part 4212 and is shaped like a straight line and the second branch curve part 4222 connected to the second branch straight part 4221.

The first branch curve part 4122 and the second branch curve part 4222 may be curved with the same curvature to face each other at a constant interval.

The second curve part 4212, the first curve part 4112, the second branch curve part 4222, and the first branch curve part 4122 may be sequentially arranged inward from an external side of the antenna 400.

The second curve part 4212, the first curve part 4112, the second branch curve part 4222, and the first branch curve part 4122 may be sequentially arranged in parallel to each other with the same interval, thereby minimizing interference of electromagnetic waves radiated from one another.

In addition, the second curve part 4212, the first curve part 4112, the second branch curve part 4222, and the first branch curve part 4122 may be shaped like an arc with the same center and the second curve part 4212, the first curve part 4112, the second branch curve part 4222, and the first branch curve part 4122 may be shaped like an approximate concentric circle or a spiral.

Thereby, the size of the second plate 210 with the first and second antenna patterns 41 and 42 arranged thereon may be minimized, thereby configuring the broadcast receiving apparatus 10 to be further compact.

The broadcast receiving apparatus 10 according to the aforementioned embodiment of the present disclosure may be configured in such a way that the antennas 300 and 400 are arranged on the inner surface of the second cover 200 and, accordingly, may transmit and receive a radio signal without connection with a separate external antenna.

In addition, the antennas 300 and 400 may be configured as a dual-band antenna and, simultaneously, may be configured in such a way that the first antenna patterns 31 and 41 and the second antenna patterns 32 and 42 are interlaced with each other and may be configured as an interdigital structure, thereby minimizing the size of the second cover 200 with the antennas 300 and 400 arranged thereon. Thereby, the size of the broadcast receiving apparatus 10 may be minimized and the compact broadcast receiving apparatus 10 may be configured.

Although the diverse exemplary embodiments of the present disclosure have been described thus far, the embodiments of the present disclosure may be used alone or in combination thereof, if necessary. In addition, the configurations and operations of the exemplary embodiments may be combined with at least one exemplary embodiment of the present disclosure.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A broadcast receiving apparatus comprising:
   a first cover with a circuit board arranged thereon;
   at least one component on the circuit board;
   a second cover couplable to the first cover to enclose the circuit board; and
   a dipole antenna comprising a first antenna pattern and a second antenna pattern arranged on an inner surface of the second cover with a portion of the first antenna pattern and a portion of the second antenna pattern being interlaced with each other, the portion of the first antenna pattern extending into the portion of the second antenna pattern, to receive a radio signal, and couplable to the circuit board to provide the received radio signal to the at least one component, and
   wherein the at least one component decodes the received radio signal into data to be transmitted to a display apparatus connected with the broadcast receiving apparatus, and
   wherein the first antenna pattern and the second antenna pattern are configured as an interdigital structure.

2. The broadcast receiving apparatus as claimed in claim 1,
   wherein the second antenna pattern is configured with the same length as a length of the first antenna pattern.

3. The broadcast receiving apparatus as claimed in claim 2, wherein the portion of the first antenna pattern and the portion of the second antenna pattern are arranged to be adjacent to each other.

4. The broadcast receiving apparatus as claimed in claim 1,
   wherein the first antenna pattern comprises a first radiator and a first branch radiator diverged from the first radiator; and
   wherein the second antenna pattern comprises a second radiator and a second branch radiator diverged from the second radiator.

5. The broadcast receiving apparatus as claimed in claim 4, wherein a portion of the second radiator, a portion of the first radiator, the second branch radiator, and the first branch radiator are sequentially arranged in parallel to each other.

6. The broadcast receiving apparatus as claimed in claim 5,
   wherein each of the first and second radiators comprises a first part, a second part bent from the first part, and a third part bent from the second part;
   wherein the first branch radiator is diverged from the second part of the first radiator; and wherein the second branch radiator is diverged from the second part of the second radiator.

7. The broadcast receiving apparatus as claimed in claim 6,
   wherein the second part of the first radiator and the second part of the second radiator are arranged in parallel to each other; and
   wherein the third part of the second radiator, the third part of the first radiator, the second branch radiator, and the first branch radiator are sequentially arranged in parallel to each other.

8. The broadcast receiving apparatus as claimed in claim 6, wherein each of the first and second antenna patterns comprises a first path from a fore end of the first part to a fore end of the third part and a second path from the fore end of the first part to fore ends of the first and second branch radiators.

9. The broadcast receiving apparatus as claimed in claim 8, wherein the first path and the second path are configured in such a way that a length of the first path and a length of the second path are different to receive frequencies in different bands.

10. The broadcast receiving apparatus as claimed in claim 9,
    wherein the first path is set to receive a signal in a very high frequency (VHF) band; and
    wherein the second path is set to receive a signal in an ultra high frequency (UHF) band.

11. The broadcast receiving apparatus as claimed in claim 10,
    wherein the length of the first path is set to 43 cm; and
    wherein the length of the second path is set to 16 cm.

12. The broadcast receiving apparatus as claimed in claim 4,
    wherein the first and second radiators comprise first and second curve parts curved with the same curvature;
    wherein the first and second branch radiators comprise first and second branch curve parts curved with the same curvature; and
    wherein the second curve part, the first curve part, the second branch curve part, and the first branch curve part are sequentially arranged in parallel to each other.

13. The broadcast receiving apparatus as claimed in claim 6, wherein the circuit board comprises a first coupling member coupled to a feeding point and a second coupling member coupled to a ground point; and wherein the dipole antenna contacts the first and second coupling members and is thereby coupled to the circuit board.

14. The broadcast receiving apparatus as claimed in claim 13, wherein the first and second coupling members comprise a "C" type clip that elastically contacts the first and second antenna patterns, respectively.

15. The broadcast receiving apparatus as claimed in claim 14,
wherein the first coupling member elastically contacts a fore end portion of the first part of the first radiator; and
wherein the second coupling member elastically contacts a fore end portion of the first part of the second radiator.

16. The broadcast receiving apparatus as claimed in claim 1, wherein the antenna is a laser direct structuring (LDS) antenna.

17. A broadcast receiving apparatus comprising:
a first cover with a circuit board arranged thereon;
at least one component on the circuit board;
a second cover coupled to the first cover; and
a dipole antenna arranged on an inner surface of the second cover and comprising first and second antenna patterns configured as an interdigital structure, to receive a radio signal, wherein
the dipole antenna is connected to the circuit board to provide the received radio signal to the at least one component, and
the at least one component decodes the received radio signal into data to be output from the broadcast receiving apparatus to a display apparatus that is external to the broadcast receiving apparatus.

18. The broadcast receiving apparatus 18,
wherein the first and second antenna patterns comprise first and second radiators and first and second branch radiators diverged inward from the first and second radiators, respectively;
wherein a portion of the first radiator is arranged between a portion of the second radiator and the second branch radiator; and
wherein the second branch radiator is arranged between the portion of the first radiator and the first branch radiator.

19. A set-top box comprising:
a first cover;
a circuit board on the first cover;
at least one component on the circuit board;
a second cover coupled to the first cover;
a dipole antenna, having first and second antenna patterns arranged as an interdigital structure, arranged on an inner surface of the second cover, to receive a radio signal,
the dipole antenna being coupled to the circuit board to provide the received radio signal to the at least one component, and
the at least one component to decode the received radio signal into audio and video data; and
a signal outputter to output the audio and video data from the set-top box to a display apparatus that is external to the set-top box.

* * * * *

UNITED STATES PATENT AND TRADEMARK OFFICE
CERTIFICATE OF CORRECTION

PATENT NO. : 10,749,578 B2  
APPLICATION NO. : 15/828685  
DATED : August 18, 2020  
INVENTOR(S) : Bum-youl Bae et al.

Page 1 of 1

It is certified that error appears in the above-identified patent and that said Letters Patent is hereby corrected as shown below:

In the Claims

Column 18, Line 3:
In Claim 18, after "apparatus" delete "18," and insert -- as claimed in claim 17, --, therefor.

Signed and Sealed this
Twenty-ninth Day of December, 2020

Andrei Iancu
*Director of the United States Patent and Trademark Office*